United States Patent Office 3,477,282
Patented Nov. 11, 1969

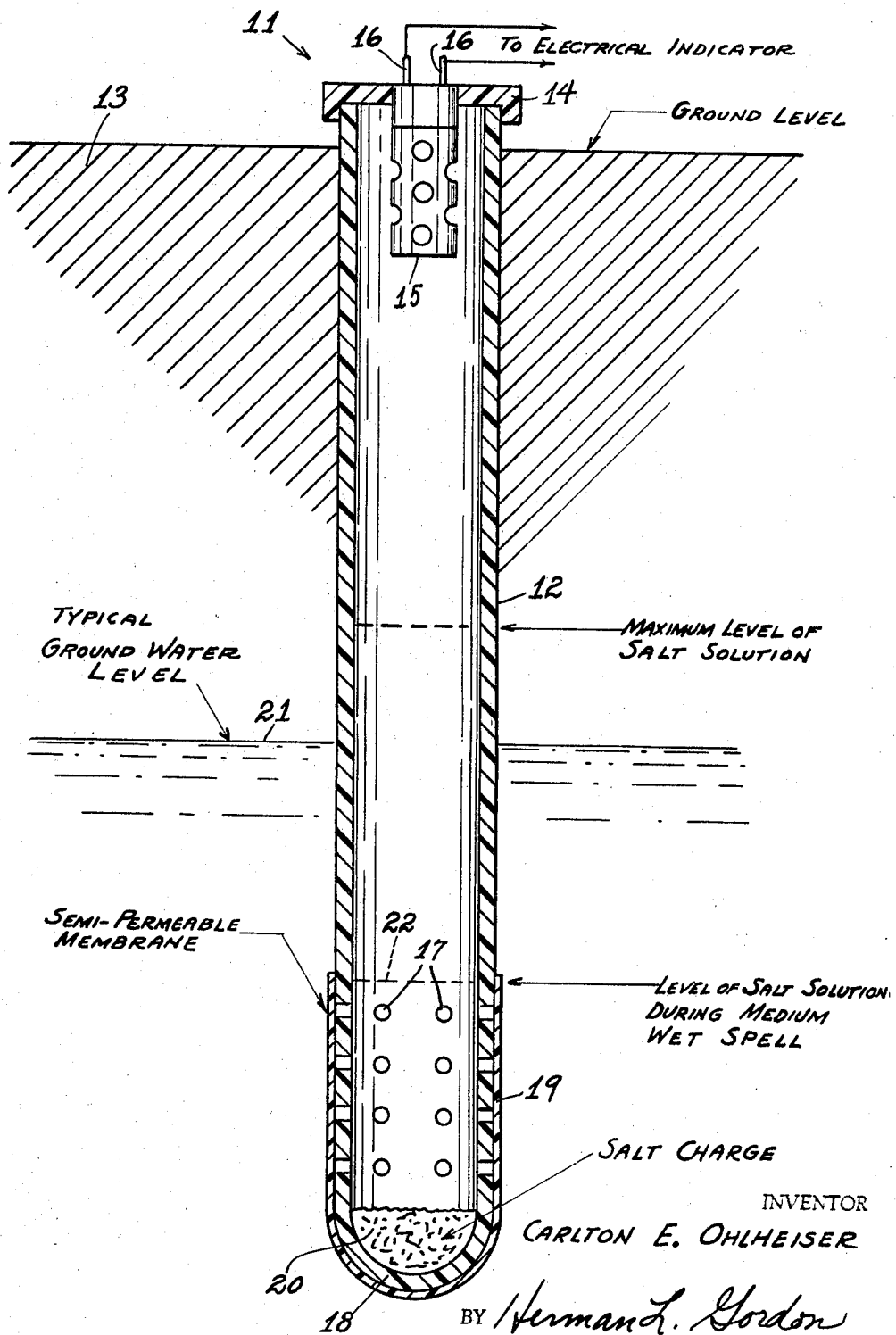

3,477,282
GROUND MOISTURE MEASURING APPARATUS
Carlton Edward Ohlheiser, Silver Spring, Md., assignor to Hygrodynamics, Inc., Silver Spring, Md.
Filed June 29, 1967, Ser. No. 649,878
Int. Cl. G01n 25/56
U.S. Cl. 73—76
8 Claims

ABSTRACT OF THE DISCLOSURE

A ground moisture measuring apparatus consisting of a rigid tubular container, sealed at its top end, adapted to be inserted in the ground to a depth at which moisture measurement is desired. The lower end of the container is perforated and contains a charge of salt. The perforated lower end is covered by an osmotic film in the form of a semipermeable membrane to allow water to pass from the ground to the salt, and reversely from the salt to the ground, by osmosis. The wet salt is always retained within the container. An electric hygrometer sensing element is mounted in the sealed top of the container and is connected to an external indicating circuit. The measured relative humidity in the free vapor space above the salt charge is always less than 100% and depends on the amount of water which has passed to the salt through the osmotic film. The process is reversible, so that the varying moisture content of the ground can be continuously measured.

---

This invention relates to moisture detection and measuring systems, and more particularly to an apparatus for measuring the moisture in soil.

A main object of the invention is to provide a novel and improved device for measuring or monitoring moisture contained in the ground, the device being simple in construction, being easy to install, involving no moving parts, and providing highly accurate and continuous measurements of soil moisture content.

A further object of the invention is to provide an improved soil moisture measuring apparatus which relies on the principle of osmosis, the osmosis occurring between moisture-bearing soil and a charge of hygroscopic material separated from the soil by a semi-permeable osmotic film or membrane, the device including means for measuring the water vapor content in the space above the hygroscopic material, the apparatus involving relatively inexpensive components, being very stable in operation, and providing accurately reproducible results, whereby the apparatus is especially suitable for continuously measuring or monitoring soil moisture conditions over long periods of time and under widely varying soil moisture conditions.

A still further object of the invention is to provide an improved soil moisture measuring or monitoring device which is durable in construction, which is not seriously affected by corrosive materials in the soil, which will not be flooded by conditions of excessive moisture in the soil, which operates accurately in accordance with changes in ground water level, and which is suitable for use either in conjunction with purely soil moisture measuring apparatus or with soil moisture controlling or adjusting apparatus.

Further objects and advantages of the invention will become apparent from the following description and claims, and from the accompanying drawing wherein the single figure is vertical cross-sectional view taken through a typical moisture measuring device constructed in accordance with the present invention.

In making measurements of soil moisture content (amount of moisture contained in the ground) many methods have been employed in the past. Several of these involve burying different types of conductive material in the ground and measuring its varying electrical resistance between two metallic electrodes, or by stabbing two metallic probes into the ground and measuring the resistance of the soil between them. Most of these methods fail because of the varying salt content or other conductive material in the ground which may be dissolved and carried to the location of measurement by the ground water or carried away from the location, as in the case of agricultural irrigation where pure water washes the salts and fertilizers out of the soil as time goes on.

In most cases, the desire is to measure the water content as relatively pure water, and the present invention provides a means for accomplishing this purpose. Since the apparatus of the present invention is adapted to provide remote measurements or indications, it can also be employed for a wide range of related applications, including control of soil moisture content and measurement and recording of same.

Referring to the drawing, 11 generally designates a ground moisture measuring apparatus constructed in accordance with the present invention. The apparatus 11 comprises a rigid tubular container 12 of any suitable noncorrodible material, such as molded plastic material, brass, copper, or the like. The container 12 is adapted to be inserted in the ground 13, as shown, with its top end protruding, and is of a length sufficient to reach the depth at which the moisture measurement is to be made. This depth of insertion, of course, varies with the problem at hand. For example, the depth would be relatively close to the surface when studying the germination of seed, whereas a much greater depth would be required for studying ground moisture distribution in forests.

The top end of container 12 is provided with a removable sealing cap 14 in which is mounted a conventional electrical moisture-sensing element 15, for example, of the bifilar-wound type, having the external electrical terminals 16, 16 which are connected to a suitable electrical indicator, not shown, providing indications in accordance with variations of electrical resistance between the terminals 16, 16.

The lower end of the tubular container 12 is formed with perforations 17 adjacent the rounded closed bottom wall 18 of the container. The perforated area may be of the order of 2 inches long, or longer if desired, proportionately in accordance with the total overall length of the tubular container. Over the perforated end of the container is sealingly secured a film of osmotic nature, shown at 19, such as cellulose acetate membrane, such that water molecules can pass through the film to a more dense or more hygroscopic material by the process of osmosis. A mass of such hygroscopic material 20 is disposed in the bottom of container 12. The material 20 may comprise any suitable hygroscopic substance, such as molasses, salt, or the like. In a typical installation, sodium chloride was employed as the hygroscopic material.

The lower portion of the wall of the tubular container 12 may be rendered freely pervious to liquid in any suitable manner. For example, instead of employing perforations 17, the lower portion of the container wall may be of porous sintered material or may include sections of porous material.

In operation, molecules of ground water pass through the film 19 by osmosis and pass through the apertures 17, moistening the hygroscopic material 20 and dissolving therein, forming a solution which is retained in the bottom of container 12. Since the material thus formed is of much greater viscosity and density than pure water, there will be an osmotic pressure between the exterior and the interior of the film 19 in accordance with the ground water level, shown at 21, establishing an interior level of solution, shown for example at 22, sufficient to provide a condition of equilibrium. The osmosis is reversible, so that if the soil dries out, causing the ground water level 21 to drop, water molecules will leave the solution by osmosis through film 19 and return to the soil, the rate of return being proportional to the difference in water vapor pressure between the two liquid-bearing regions.

The electrical humidity sensing element 15 responds to the changes in moisture content of the space inside container 12 by altering its electrical resistance as the number of water molecules in the space (the vapor above the wet salt 20) changes. This change is detected on the external indicator, and may be employed to operate suitable control means, such as an irrigation or sprinkler water supply valve, to restore a desired relative humidity condition in the interior of container 12.

Since the tubular container 12 is pressure-sealed by its cap 14, air leakage will not occur and an internal pressure is generated during osmotic inflow. Said internal pressure consists of the total water vapor pressure in the container plus the gaseous pressure of the original air present in the container. To some degree the compression of this original air volume will limit the amount of water taken into the container by resisting the osmotic process. In certain prior art systems (not employing a semipermeable membrane) the developed internal pressure is measured by using a pressure gauge mounted in the top of the container and reading the pressure variation, which is related to values of moisture in the soil or to the ground water level. These readings, however, cannot be conveniently observed remotely and the resolution (the ability to read small variations of soil moisture) is inherently very poor. In the device of the present invention, the use of the electrical humidity sensing element 15 makes it possible to detect relatively small soil moisture changes and gives the apparatus satisfactory resolution.

It is to be noted that by employing the semipermeable membrane 19, the sensor 15 cannot be flooded. Also, a sufficient quantity of hygroscopic material 20, such as salt, is employed so that the material cannot be completely dissolved in the osmosed soil water. In other words, the maximum measurement which can be made by the element 15 is 100% relative humidity, and the practical working range of the element is always below 100% relative humidity.

The preferred hygroscopic material 20 is a salt because a salt in many of its chemical combinations has the property of reducing the free water vapor pressure in contact with it to some value below the saturation level, or in other words, below 100% relative humidity. By employing such material as sodium chloride in excess amounts, it is possible to limit the free water vapor pressure inside the container 12 to a value corresponding to approximately 75% relative humidity. Other salt material, such as lithium chloride, has the ability to limit the adjacent free water vapor pressure to a value corresponding to approximately 11% relative humidity.

The effect of using the salt material inside container 12 as above described is to lower the relative humidity in the free vapor space thereabove to a value which is always below 100%. Assuming a sufficient amount of salt is employed to always maintain at least one solid particle of crystalline material, the relative humidity in the vapor space thereabove will always be below 100%. With a definite measured quantity of salt, the apparatus will always give reproducible measurements of soil moisture.

Since the osmotic process is freely reversible, the water leaves the salt as the soil dries, and the salt retrieves water as the ground water level 21 again rises. These variations in soil moisture conditions can therefore be accurately and continuously measured without the danger of saturation conditions occurring in the upper portion of container 12. The measurements may be read electrically and remotely on a continuous basis, or at intervals by a portable battery operated reader. The device may also be connected to a recorder in a manner such that by using suitable switching arrangements, a plurality of differently located soil moisture measuring devices 11 may be connected in turn to a centrally-located multistation recorder to provide respective traces on a multi-trace chart, corresponding to the respective local soil moisture variations. In the same manner, respective sprinkler or irrigation solenoid valves may be automatically controlled to provide moisture to the various locations as required, in response to low limiting values of measured relative humidity.

The osmotic film 19 restricts the passage of fluid to pure water molecules, and does not allow natural soil water containing salts and other dissolved material to flow into the container 12 and contaminate its contents.

While a specific embodiment of a ground moisture measuring apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A soil moisture measuring device comprising a container adapted to be inserted in the ground, said container having a wall portion which is freely pervious to liquid and being otherwise sealed, a semipermeable membrane completely covering said pervious wall portion for transmitting water molecules only by osmosis into and out of the container, a quantity of hygroscopic material in the lower portion of the container, and an electrical humidity sensing element mounted in the container in the space above said hygroscopic material.

2. The soil moisture measuring device of claim 1, and wherein the container is substantially tubular and said pervious wall portion is located adjacent the bottom end of the container.

3. The soil moisture measuring device of claim 2, and wherein the container is of substantially rigid material.

4. The soil moisture measuring device of claim 3, and wherein said pervious wall portion is formed by providing perforations in the lower portion of the container.

5. The soil moisture measuring device of claim 1, and wherein said hygroscopic material comprises a salt.

6. The soil moisture measuring device of claim 5, and wherein said salt is sodium chloride.

7. The soil moisture measuring device of claim 4, and wherein the semipermeable membrance comprises a cellulose acetate film.

8. The soil moisture measuring device of claim 7, and wherein the container is provided with a removable top sealing cap and the electrical humidity sensing element is mounted in said sealing cap and depends into the upper portion of the container.

References Cited

UNITED STATES PATENTS

| | | | |
|---|---|---|---|
| 1,690,672 | 11/1928 | Dunlap | 73—73 |
| 2,723,557 | 11/1955 | Ohlheiser | 73—73 |
| 2,737,562 | 3/1956 | Thornton | 338—35 |
| 2,947,166 | 8/1960 | Palmer et al. | 73—40.7 |
| 3,091,115 | 5/1963 | Roberts | 73—73 |
| 3,253,458 | 5/1966 | Katz et al. | 73—73 |
| 3,056,935 | 10/1962 | Jensen | 338—35 |
| 2,878,671 | 3/1959 | Prosser et al. | 73—73 |
| 3,045,477 | 7/1962 | Matson | 73—73 |

FOREIGN PATENTS

| | | |
|---|---|---|
| 158,349 | 8/1954 | Australia. |
| 435,815 | 10/1926 | Germany. |

RICHARD C. QUEISSER, Primary Examiner

CHARLES E. PHILLIPS, Assistant Examiner